United States Patent [19]

Ferris

[11] 4,284,387
[45] Aug. 18, 1981

[54] BLADE FOLD RESTRAINT SYSTEM
[75] Inventor: Donald L. Ferris, Newtown, Conn.
[73] Assignee: United Technologies Corp., Hartford, Conn.
[21] Appl. No.: 35,364
[22] Filed: May 2, 1979
[51] Int. Cl.³ .................... B64C 11/28; B64C 27/38; B64C 27/50
[52] U.S. Cl. .................. 416/134 A; 416/141; 416/143
[58] Field of Search ............... 416/134 A, 141, 142, 416/143, 153, 140 A

[56] References Cited

U.S. PATENT DOCUMENTS

| 2,405,777 | 8/1946 | Buivid | 416/143 |
|---|---|---|---|
| 2,549,886 | 4/1951 | Buivid | 416/142 X |
| 2,925,130 | 2/1960 | Buivid | 416/143 |
| 3,153,455 | 10/1964 | Mosinskis | 416/143 X |
| 3,247,907 | 4/1966 | Mosinskis | 416/143 X |
| 3,282,350 | 11/1966 | Kisovec | 416/134 A X |
| 3,759,631 | 9/1973 | Rybicki | 416/134 A |
| 3,778,189 | 12/1973 | Ferris | 416/134 A |
| 3,853,426 | 12/1974 | Rybicki | 416/134 A X |
| 4,028,001 | 6/1977 | Watson | 416/141 X |

FOREIGN PATENT DOCUMENTS 2709199 9/1977 Fed. Rep. of Germany ........... 416/141

Primary Examiner—Everette A. Powell, Jr.
Attorney, Agent, or Firm—Vernon F. Hauschild

[57] ABSTRACT

In a fully articulated helicopter rotor head, utilizing an elastomeric bearing to support each rotor blade and react centrifugal flight loads, a blade restraint, effective in three axes is provided for use during blade folding for aircraft stowage purposes. The restraint allows the blade to be folded through a predetermined fold plane, and held there while preventing or minimizing deflection of the elastomeric bearing.

7 Claims, 5 Drawing Figures

BLADE FOLD RESTRAINT SYSTEM

The invention herein described was made in the course of or under a contract or subcontract thereunder with the Department of the Navy.

BACKGROUND OF THE INVENTION

Field of Invention

For substantially fifty years Sikorsky model helicopters have been identified as single main rotor type aircraft wherein three of more rotor blades are separately attached to arms extending from a central hub, and wherein the blade connections allowed full articulated flight motion to each blade. That is, each blade support includes a set of metal bearings postioned about an axis extending radially from the hub. The axis is called the feathering axis, and blades so supported are able to be rotated by the pilot operated control linkage in order to change the pitch or angle of attack of the blade. A second set of metal bearings are located coincident with the first set, at the blade root, inboard of the feathering bearings and in substantially a horizontal plane. These bearings act as a hinge joint, and allow the blade to make vertical excursions, either flapping upwards in flight or drooping downwards when stationary. A third set of metal bearings are located coincident with, and perpendicular to, the second set. These bearings act as a vertical hinge to allow blade motion in a horizontal (or inplane) direction, either "leading" when in the direction of rotation, or "lagging" when in the opposite direction. For helicopters destined to be parked in confined spaces, or transported to holding areas in small ship elevators, an additional and substantially vertically oriented fold hinge joint is added to the blade at a radial station outboard of the aforementioned three sets of bearings. Manual or automatic systems are used to fold blades into a predetermined nested arrangement. U.S. Pat. No. 3,097,701 to Buivid illustrates a typical Sikorsky rotor head incorporating all of the above features. Prior to pilot initiation of blade folding it is necessary that the rotor be stopped and that an indexing system be actuated to place the rotor head in its predetermined orientation. Each fold hinge pin has been geometrically designed to allow its associated blade path to be free from obstruction by other blades or parts of the aircraft. Rotor stopping also allows centrifugally operated droop and anti-flap stops to engage the blade and restrain it from vertical motion, thus preventing the articulated blade from striking the fuselage when centrifugal loading has decayed, or from rising under the influence of a wind gust. These mechanisms thus work as a pair to restrain the blade from motion about only one of its three axes. Secondly, prior to initiation of blade folding, it is necessary to place each blade and fold hinge joint in a predetermined angular position relative to the longitudinal axis of the aircraft. This is also for the purpose of assuring that the blade follows its programed path to its specific fully folded position. A rotor positioning system indexes the rotor hub arms to a pre-oriented in-plane position. The lag dampers, by a system of differential areas, position the blade and fold hinge in respect to the hub arms to a pre-oriented in-plane position. It is necessary to address and restrain the blade from its third axis of freedom, namely the pitch axis, in order to avoid severe loads or damage being placed on the control linkages to the blade, and prevent blade from striking the ground during folding. The mechanism widely used, and commonly called the "pitch lock" is illustrated in Buivid U.S. Pat. No. 3,097,701 and constitutes a retractable pin used to engage a rotatable blade portion to a non-rotatable portion. The pitch lock does not restrain the blade from flapping or lagging motions. It should be noted that these three separate and independent mechanisms are used to respectively restrain each blade from motion about its respective bearing axis, and only that axis. A further illustration of the prior art pitch lock on a Sikorsky model helicopter is found in U.S. Pat. No. 2,405,777 to Buivid. Other manufacturers' helicopters have used similar bearing and fold hinge configurations with external pitch locks connecting movable pitch shafts to stationary housings. U.S. Pat. Nos. 3,153,455 to Mosinskis, 3,187,818 to Barrett et al and 3,247,907 to Mosinskis, all illustrate such a pitch lock.

A variation to the external pitch lock for the Sikorsky type helicopter comprising an internal spline engagement between a movable blade sleeve and stationary spindle is shown in U.S. Pat. Nos. 3,369,611 and 3,438,446, both co-inventions of applicant Ferris. As an alternate to the external pitch lock pin configuration, the spline configuration may be favored because of its internal location, decreasing the vulnerability to external damage, decreased aerodynamic drag and reduction of the number of crowded components in the confined rotor area. To receive these advantages, the designer must acknowledge that greater loads will be imposed on the spline configuration than on the external pin due to the closer proximity of the spline to the pitch axis and its therefore shorter moment arm.

A further alternate pitch lock system is illustrated relative to a Sikorsky type helicopter in U.S. Pat. Nos. 3,764,229 to Ferris et al and 3,765,794 to Kudasch et al. While the structure depicted in these patents was incorporated into a Sikorsky rotor head including an elastomeric bearing blade support, as depicted in U.S. Pat. No. 3,853,426 to Rybicki, the configuration can also be utilized in rotor heads having separate bearings for feathering, flapping, and in-plane blade motions. A disadvantage of this alternate configuration is the compromising of the capability to predetermine the precise folded position of each blade, as well as its path to such position due to the static deflection of the control. This is also due to the large number of related parts between the blade fold hinge and the lock mechanism, each with its range of manufacturing tolerance. Deviations between possible blade positions can vary up to several degrees, and when in their folded positions may not be allowable, depending on the restricted size envelope for folded blades.

With the advent of the elastomeric type rotor head, as depicted in U.S. Pat. No. 3,782,854 to Rybicki, coupled to the requirement for precise blade folded positioning, a pitch lock system other than that illustrated in U.S. Pat. Nos. 3,764,229 and 3,765,794 was required. A further complication for the system was a compatability requirement with the standard Sikorsky system for blade interchangeability as described in U.S. Pat. No. 3,008,525 to Jensen. Under Jensen's system, blades deviating due to manufacturing tolerances are brought into track by selective adjustment to the length of the associated pitch change rod. Since this system would otherwise result in variations of several degrees for a blade, it was a further requirement that the pitch lock incorporate an adjustment feature that could interrelate with the tracking adjustment, and any additional adjustment to collective setting of the rotor to improve flight condition. A still further requirement for our fold restraint system was the capability of manual pitch lock engagement in the event of failure of the automatic activation system.

The prior art Sikorsky internal spline system described in U.S. Pat. Nos. 3,369,611 and 3,438,446 was considered and rejected because of its short moment arm, and the magnitude of the high folding loads, high-wind loads, and rolling of the aircraft on deck of a ship at sea. Manual engagement of this internal spline pitch lock is extremely difficult because of its internal inaccessability. Further, we have found the addition of an adjustment feature to this internal spline system to be extremely complex. An illustration of the spline lock system in the elastomeric bearing rotor application is found in U.S. Pat. No. 4,028,001 to Watson. One desirable apparent feature of such configuration is that the spline pitch lock functions not only to lock the blade at a preselected pitch setting, but may also restrain the blade from excursions in flapping and in-plane directions. Such restraint is necessary not only to maintain a predetermined path during folding and to hold the blade in its folded position, but might also be needed to prevent excessive bearing shear motions, which could rupture the elastomeric bearing. This concern was an added consideration for the designer, introduced by the use of the elastomeric type bearing, which achieves the full articulation provided in the past by three separate bearing sets.

With the above objectives and requirements in mind the configuration described hereinafter was conceived as a pitch, flap and lead-lag restraint system for the elastomeric rotor system of the type depicted in U.S. Pat. No. 3,782,854 to Rybicki. Key elements have been selected from the prior art pitch lock systems, then selectively arranged and oriented to co-act for the first known time with known anti-flap and droop stops, and provided with the addition of a tolerance accommodating and adjustment system. Further, manual provisions have been provided for engaging the pitch lock in case of mechanical failure of the system. Thus, an alternate to the specific fold restraint system for U.S. Pat. No. 4,028,001 to Watson is provided which utilizes all the advantages described therewith, and in addition achieves the stated new benefits.

Other objects and advantages of the present invention may be seen by referring to the following description and claims, read in conjunction with the accompanying drawings.

DESCRIPTION OF THE PREFERRED EMBODIMENT

Figure 1:
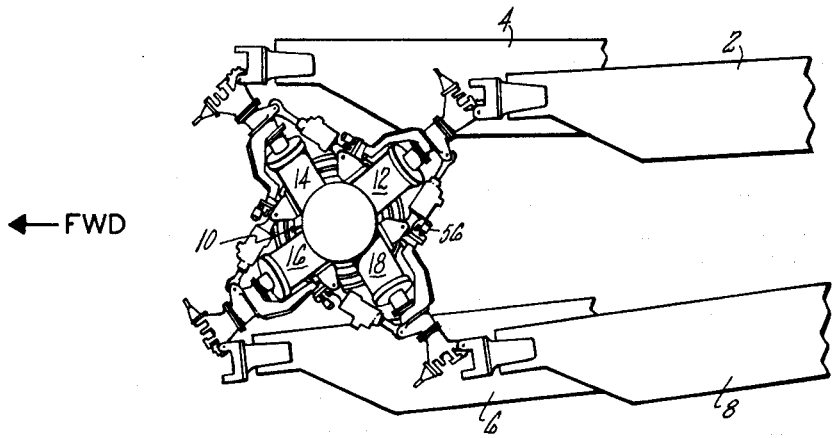
FIG. 1 is a top view of our elastomeric rotor head illustrating its four blades in folded position.

In order to park a number of helicopters in a limited area, such as in a designated area of a ship's flight deck, or a single helicopter in a hanger on a small ship, it is desirable to reduce the envelope of the helicopters without dismantling any of its flight components. It is also desirable to have the large blades nested and held alongside the aircraft fuselage in order to minimize the blade motion effects of wind gusts and heavy seas. This creates the need for a helicopter automatic blade fold system including a pitch lock system for parked aircraft. FIG. 1 illustrates the specific folded configuration of the Navy SH-60B 4-bladed rotor head.

Figure 2:
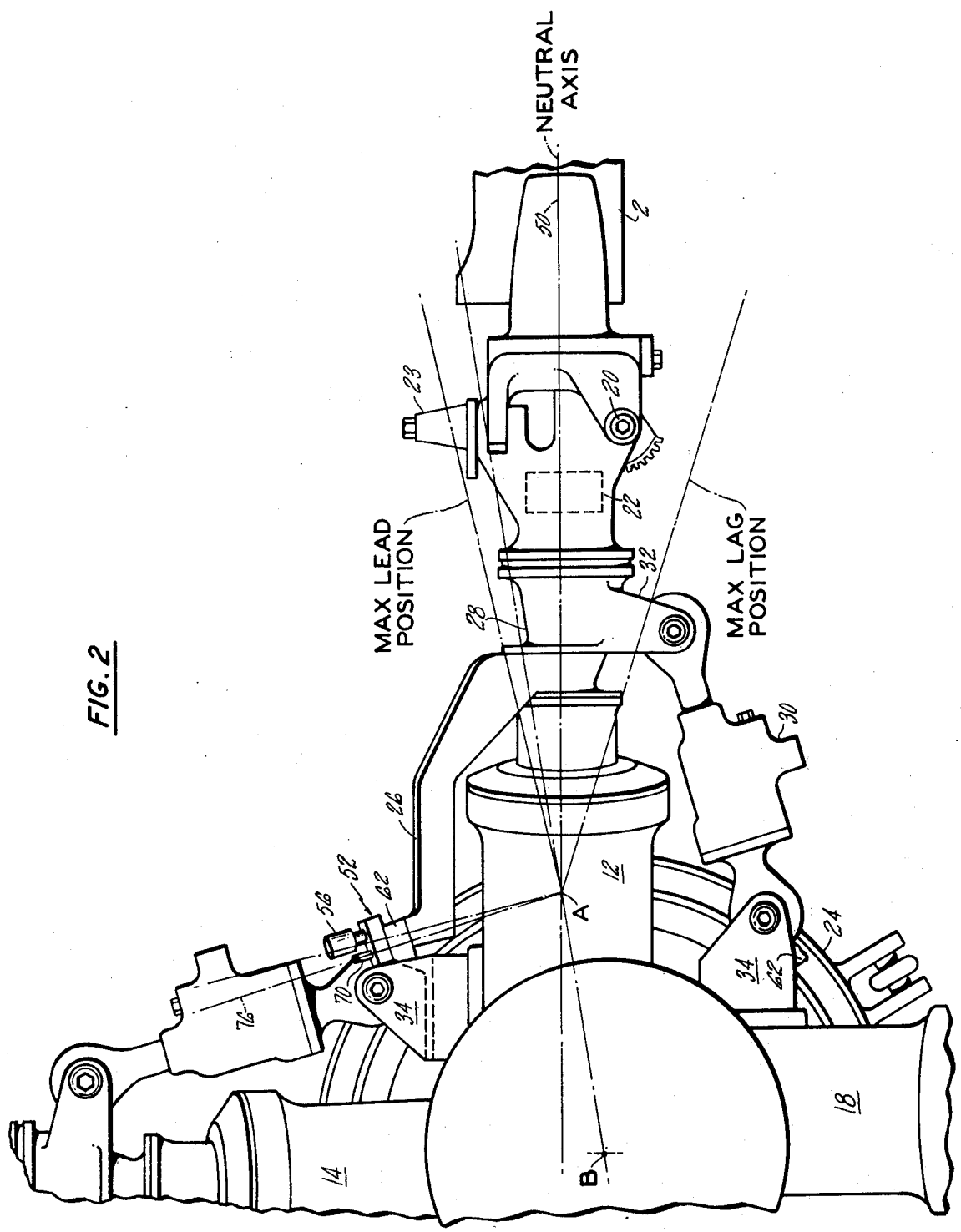
FIG. 2 is a more detailed top view showing a portion of the rotor head of FIG. 1.

During flight modes, rotor blades 2, 4, 6, and 8 extend generally radially from hub 10 having arms 12, 14, 16, and 18 each associated with and supporting its rotor blade through an elastomeric bearing as more specifically shown in U.S. Pat. No. 3,782,854. As shown in FIG. 2, typical blade 2 is shown extending from hub arm 12, with the focal point of its internally located elastomeric bearing 36 (FIG. 3) located at A, relative to the rotor axis of rotation B. An outboard fold hinge 20 is provided for each blade as well as a suitable internal fold actuator system 22, such as that described in U.S. Pat. No. 3,097,701.

Pilot control inputs are made in a conventional manner to swashplate 24, which is connected through a vertical push rod (not shown) to control horn 26 which is attached to the leading side of the root end 28 of blade 2. Lead and lag damper 30 is likewise connected at one end to lug 32 on the trailing side of the root end 28 of blade 2, and at its inboard end to bracket 34, which is attached to hub arm 18.

Figure 3:
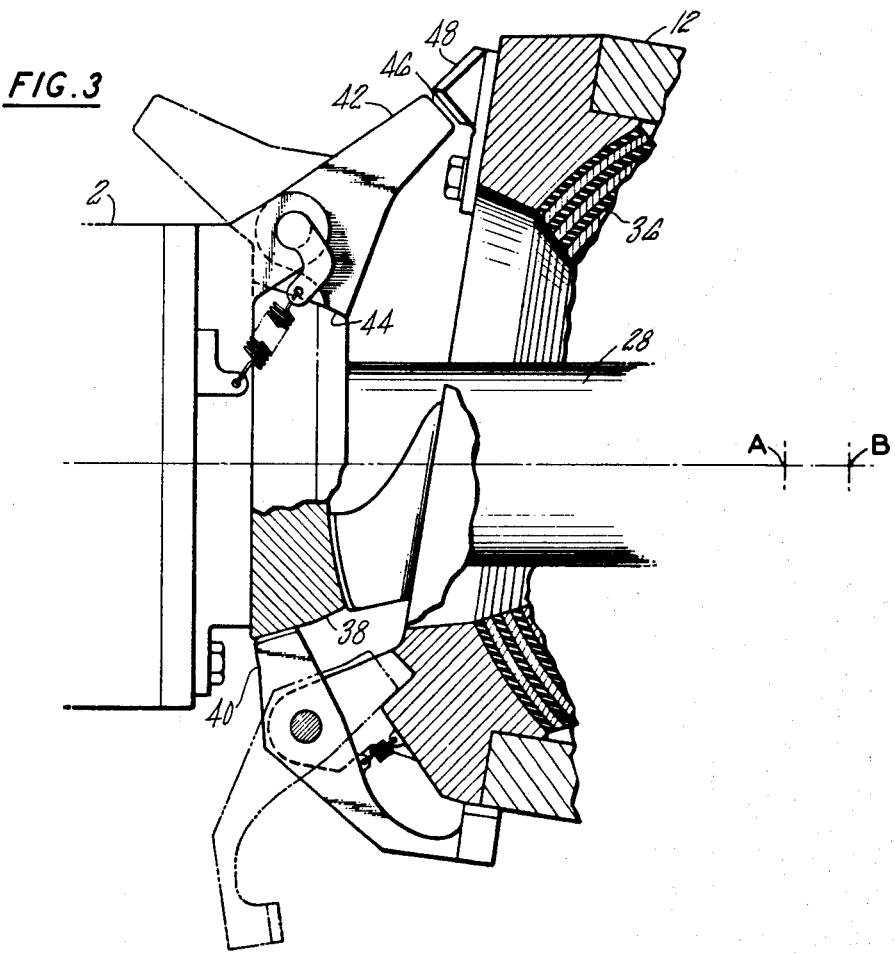
FIG. 3 is a side view of a portion of the rotor bearing and blade root, specifically illustrating the anti-flap and drop mechanisms.

With reference to FIG. 3 we see a cross section of elastomeric bearing 36 contained in hub arm 12, and through the center of which passes the root end 28 of blade 2. In this figure the blade is shown in its stationary position wherein collar 38 is resting on droop stop 40, and anti-flap stop 42 is in its static position wherein first face 44 is in contact with collar 38, and its second face 46 is in alignment and at a slight clearance from pad 48 attached to hub arm 12. The droop stop mechanism is more fully described with reference to FIG. 8 of U.S. Pat. No. 3,853,426 to Rybicki, and the specific illustration of the anti-flap and droop stop for the SH-60B helicopter is described in pending U.S. Pat. Application Ser. No. 919,357, filed June 26, 1978 entitled Elastomeric Helicopter Load Reaction System in the name of Donald L. Ferris et al.

Figure 4:
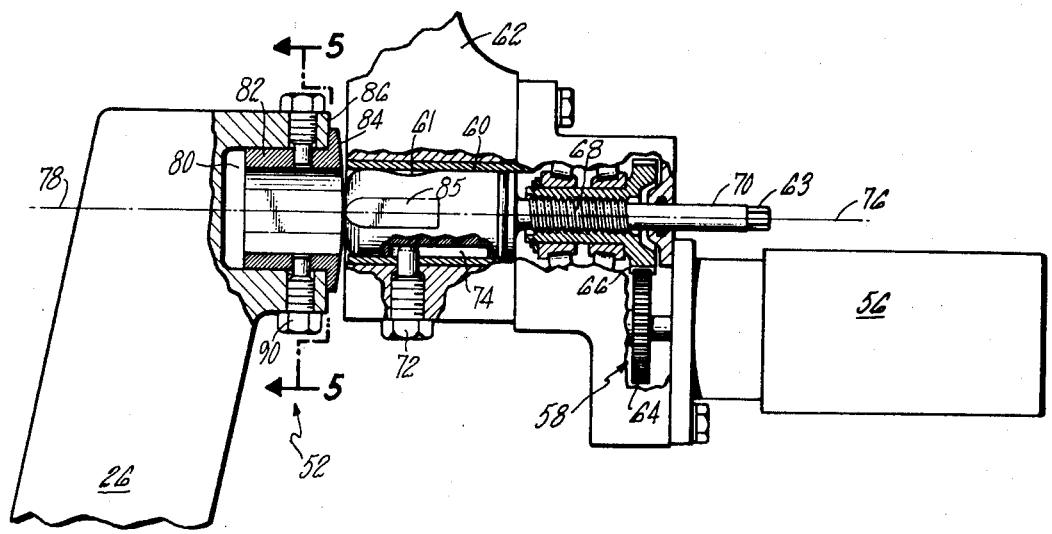
FIG. 4 is a cross-sectional showing of one of the engaging restraint pins depicted in FIG. 2.

As shown in FIG. 2, at the extremity of the control horn 26 most distant from the installed pitch change axis 50, is located a pitch lock assembly 52. Pitch lock assembly is shown more particularly in FIGS. 4 and 5. This assembly 52 is located in the general area of the joint 54 (FIG. 5) connecting the control horn 26 to the swashplate 24, and consists of a reversible electric motor actuator 56 and associated gear drive mechanism 58 adapted to provide axial motion to lock pin 60. Pitch lock assembly 52 is mounted on bracket 62, which is in turn fixed to hub arm 12 through bracket 34. Gear mechanism 58 includes motor output gear 64 and mating gear 66 having an internal threaded connection 68 with shaft 70 of pin 60. Set screw 72, extending into keyway 74 of pin 60, restrains pin from rotation when the motor 56 is actuated. It should be noted that the axis 76 of pin 60 is preferably offset from the horizontal plane, and passes through the focal point A of the elastomeric bearing 36. The angular relationship of axis 76 relative to pitch axis 50 is important to this invention. Axis 76 of pin 60 is shown in FIG. 4 in alignment with axis 78 of aperture 80 in control horn 26. It must be realized that there are several factors which effect the capability to achieve this alignment of relatively movable axes. The position of axis 78 is a function of the instant angle of attack of the blade 2, and the instant length of the variable length pitch change control link connecting the swashplate 24 to joint 54 on control horn 26. The angular out-of-track deviation of blade 2 relative to a master blade and variation of collective deviations due to flight adjustment characteristics determines the installation correction to be made to the length of the vertical control link, and thus the position of the horn, pitchwise to the hub. Further, any manufacturing tolerances in the blade root 28, control horn 26, hub arm 12, brackets 34 and 62, and pitch lock assembly 52 must also be accommodated by the adjustment features provided by the means located in aperture 80 to bring axes 76 and 78 into alignment.

Figure 5:
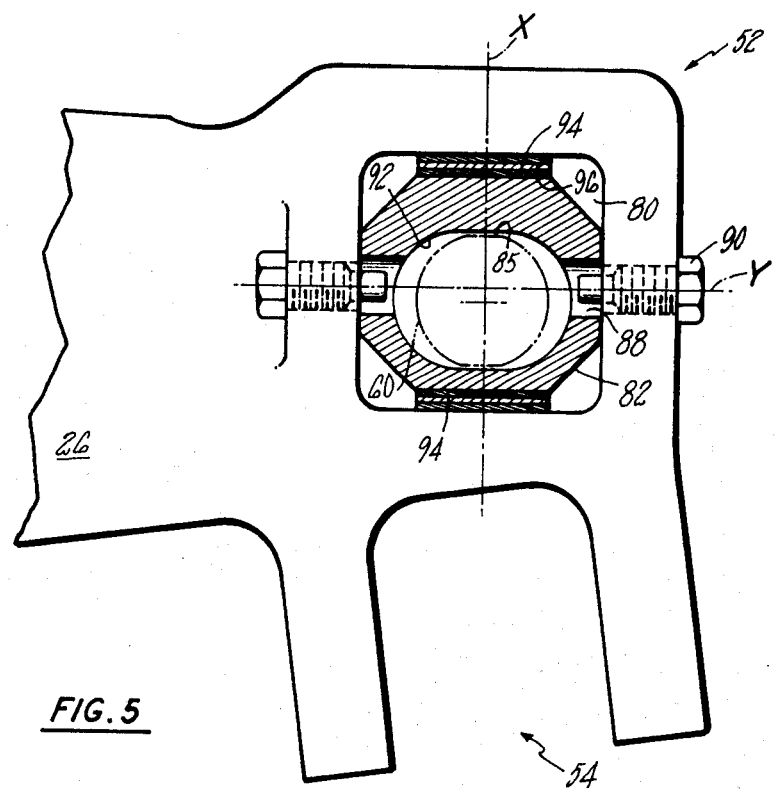
FIG. 5 is a cross-sectional showing of the restraint pin and socket taken at section 5—5 of FIG. 4.

FIGS. 4 and 5 illustrate the pitch lock adjustment means, the major component being a liner 82, which is inserted into substantially square walled aperture 80 in control horn 26. The aperture defines perpendicular axes X and horizontal axis Y. Flange 84 of liner 82 abuts face 86 of horn 26, and flange 84 outer face is substantially spherical from bearing axis A to allow uniform clearance when pin 60 is retracted and the control horn responds to pilot control inputs. Its surface is hardened to survive contact with pin 60. Opposed slots 88 in liner 82 receive set screws 90, retaining the liner 82 in the aperture 80. The liner 82 is square sided to seat in aperture 80, and its corners are generously chamfered. An eccentric located slot 92 is provided in liner 82 and adapted to receive cylindrical pin 60. Localized flats 85 are machined into pin 60 to provide area contact when pin 60 abuts the flat side of slot 92. FIG. 5 illustrates pin 60 in its intended position within liner 82. The diameter of pin 60 is dimensioned slightly less than the height of slot 92 in the X axis direction, thus allowing the pin to rotate in the slot 92 when manually engaging pin by removing set screw 72 from keyway 74 of pin 60 in an instance of failure of motor 56. The leading nose of pin 60 is radiused to allow for greater misalignment with slot 92. In addition, a large radius undercut 61 is made circumferential around pin 60 outboard of the localized flats 85 to provide for angular misalignment of axis 78 and 76 of pin 60 in slot 92 without generating local binding or contact. In the event of failure of motor 56, a brake within the motor will engage, holding gear 66 and motor output gear 64 against torque required to turn pin 60 manually. Pin 60 can then be hand cranked into engagement by applying a socket wrench to its exposed end 63. In addition, motor 56 includes a suitable clutch in the event that misalignment is severe so that no damage to the mechanism will occur. Further, circling of the cyclic stick or reprogramming would then be needed to engage the pitch lock pin 60.

The liner 82 provides adjustment capabilities to axes 76 and 78 as follows: Since slot 92 is substantially longer in the Y-axis direction than the diameter of pin 60, misalignment can be accommodated to the extent of the difference in the dimensions of pin 60 and slot 92. On the opposite faces 94 of liner 82 are adhesively attached a number of thin metal shims 96. As illustrated, there are an equal number of shims 96 adjacent each face 94.

Since slot 92 is eccentric to liner 82, mere rotation of liner 82 through 180° provides a reorientation of the slot 92 in the X-axis direction. This course adjustment may be accompanied by a second displacement of the liner in the X-axis direction merely by moving one or all of the shims 96 to the top from the bottom side of liner 82 or from bottom to top side of liner. Since the only function of the set screws 90 is to retain the liner within the aperture, the associated slots 88 may be as long as required to accommodate the full range of adjustment of the liner in the X-axis direction. With this adjustment capability in two directions, it is possible to accommodate both the calculated manufacturing and misalignment tolerances of all rotor head associated parts and the Jensen blade pre-tracking system and any collective adjustment made to the rotor to improve flight characteristics.

By viewing FIG. 2 it is noted that the blade 2 feathering axis 50 as depicted as emanating from bearing 36 focal point A, does not intersect rotor axis B. Bearing 36 has been installed in a relaxed condition at a pre-lag angle of about 7° in order to anticipate its normal flight operational position. This will allow the bearing to be at its minimally deflected shear position in this flight condition. The operating actions of the helicopter in rotor starting and stopping will cause the blade 2 to make in-plane excursions of up to 10° in each direction to the extent of their limit stops, as provided in damper as described in the aforementioned pending Patent Application Ser. No. 919,357. These positions of the blade feathering axis in maximum lead and lag are depicted in FIG. 2. FIG. 2 also illustrates the theoretical position of the blade flapping axis for a blade in is maximum lead position. The axis 76 of the pitch lock assembly 52 is installed at an angle of several degrees inboard of this theoretical flapping axis, coincident with focal point A of bearing 36. In addition axis 76 of the pitch lock assembly 52 is installed at an angle of several degrees above the rotor plane but still coincident with focal point A of bearing 36.

BLADE FOLDING OPERATION

When the rotor is slowed to a stop, the centrifugally operated anti-flap stops 42 and droop stops 40 return to their spring biased static positions and restrain the blade from vertical motions beyond the stop limitation in both directions. The pre-positioning feature of damper 30 positions blade to its maximum lead positions (FIG. 2). The rotor is then positioned in respect to the fuselage for blade to fuselage orientation by a rotor head positioning system. It must be understood that proper blade folding first depends on ground crews having made the necessary adjustment to the liner of the pitch lock assembly as a result of having changed a blade or other rotor head component, and secondly depends on the pilot or programing means of placing his controls at a predetermined collective and cyclic pitch setting. At this point in the sequence it is expected that the liner axis 78 will be properly aligned with the pin axis 76. With the pin 60 seated, blade lock pin puller 23 is energized to unlock the fold hinge, and the blade may be folded to its stowage position about vertical hinge 20.

It will now be noted that the blade flapping, lead/lag, and pitch axes are effectively locked, and that all blades and their associated elastomeric bearings are restrained from any significant degree of motion in any direction that would allow blade motion due to wind gusts or ship motion that would otherwise cause damage to blades, other helicopter parts, or the ship on which it is located. By reference to FIG. 1, it can be noted that with blades in their folded positions, supported on fold hinge 20, any wind forces on blades 2, 4, 6, or 8 will tend to make them rise or fall vertically and dead weight of blade will attempt to twist the blade root and thus the pitch horn. The pitch lock assembly 52 restrains such twisting, due to the orientation of the pin 60, which will react in shear against the top or bottom surfaces of the liner 82 in pitch horn. Only a slight clearance between the liner slot 92 and the pin 60 allows motion. Thus locked, the bearing 36 will not receive any additional shear inputs.

Likewise, the pitch lock assembly 52 provides restraint of blade motions in the in-plane direction by the pitch lock pin axis being near perpendicular to this in-plane direction. With the pitch lock assembly 52 engaged, control horn 26 is connected to the hub arm 12. Such fixation serves to free the elastomeric bearing 36 from in-plane shear motions. Dual fixation is likewise provided in the vertical direction, consisting of the restraints offered by the pinching actions of the anti-flap stop 42 and droop stop 40, acting together with the pinned restraint of pitch lock assembly 52, since pitch lock pin axis is out of plane with the flapping axis.

The aforementioned interrelationship between anti-flap stops, droop stops, and pitch locks for blade folding is brought into existence because of the full articulated freedom of the elastomeric bearing, whereas these individual elements functioned as a single plane restraint in prior art systems using separate bearings for pitch change, vertical and in-plane blade excursions.

I wish it to be understood that I do not desire to be limited to the exact details of construction shown and described, for obvious modifications will occur to a person skilled in the art.

I claim:

1. In a helicopter rotor wherein each blade is independently supported from a hub arm for full articulated flight motions by an elastomeric bearing establishing blade pitch, flapping, and lead/lag axes all intersecting at the focal point of the bearing, and having flight control linkage including a blade mounted pitch control horn, and further having a blade fold system including a substantially vertical blade fold hinge for each blade, located outboard of and independently of the elastomeric bearing; an improved three axis blade restraint mechanism for said fold system characterized by a lock assembly mounted on the hub arm and including a retractable pin adapted to engage the radial extremity of the pitch control horn, wherein the pin axis is offset from the blade pitch, flapping, and lead/lag axes and also intersects the focal point of the elastomeric bearing.

2. A rotor as claimed in claim 1 wherein said lock assembly includes both automatic and manual actuation means.

3. A rotor as claimed in claim 1 wherein said lock assembly includes adjustable alignment means.

4. A rotor as claimed in claim 3 wherein said adjustable alignment means includes a liner mounted in an aperture of the control horn, said liner having an elongated slot to receive the retractable pin.

5. A rotor as claimed in claim 4 wherein said adjustable alignment means further includes removal shims located externally of the liner and within the control horn aperture.

6. A rotor as claimed in claim 4 wherein the adjustable alignment means is dimensioned to limit blade in-plane motion to the extent of the difference in dimensions between the length of the liner slot and the diameter of the pin.

7. A rotor as claimed in claim 1 wherein the lock assembly is mounted on the hub arm slightly above the rotor plane, and the offset of the pin axis from the flapping axis is on the inboard side of the flapping axis.

* * * * *